United States Patent
Hattori

(10) Patent No.: US 8,112,617 B2
(45) Date of Patent: Feb. 7, 2012

(54) INFORMATION PROCESSING DEVICE, AND METHOD OF STARTING INFORMATION PROCESSING DEVICE

(75) Inventor: Yasuhiro Hattori, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 396 days.

(21) Appl. No.: 12/404,656

(22) Filed: Mar. 16, 2009

(65) Prior Publication Data

US 2009/0240932 A1   Sep. 24, 2009

(30) Foreign Application Priority Data

Mar. 18, 2008 (JP) .............................. 2008-070399
Oct. 23, 2008 (JP) .............................. 2008-273461

(51) Int. Cl.
G06F 9/00 (2006.01)
G06F 15/177 (2006.01)
G06F 9/44 (2006.01)
G06F 9/445 (2006.01)

(52) U.S. Cl. ................ 713/1; 713/2; 713/100; 709/220; 717/168; 717/174

(58) Field of Classification Search .................. 713/1, 2, 713/100; 709/220; 717/168, 174
See application file for complete search history.

(56) References Cited

U.S. PATENT DOCUMENTS

| | | | |
|---|---|---|---|
| 6,434,696 B1 * | 8/2002 | Kang ................................ 713/2 |
| 6,708,234 B2 | 3/2004 | Moteki et al. | |
| 6,980,702 B2 | 12/2005 | Michiie et al. | |
| 7,034,838 B2 | 4/2006 | Obata et al. | |
| 7,136,994 B2 * | 11/2006 | Zimmer et al. ................... 713/2 |
| 7,142,730 B2 | 11/2006 | Michiie et al. | |
| 7,185,151 B2 | 2/2007 | Michiie et al. | |
| 7,259,876 B2 | 8/2007 | Obata et al. | |
| 2003/0063305 A1 * | 4/2003 | McIntyre ..................... 358/1.13 |
| 2006/0212629 A1 | 9/2006 | Suzuki et al. | |
| 2006/0215221 A1 | 9/2006 | Suzuki et al. | |
| 2006/0242398 A1 * | 10/2006 | Fontijn et al. ..................... 713/2 |
| 2007/0223068 A1 | 9/2007 | Ishii et al. | |
| 2008/0276222 A1 * | 11/2008 | Yamagami .................... 717/124 |

FOREIGN PATENT DOCUMENTS

JP   9-319667   12/1997
JP   2000-242503   9/2000

* cited by examiner

*Primary Examiner* — Stefan Stoynov
(74) *Attorney, Agent, or Firm* — Oblon, Spivak, McClelland, Maier & Neustadt, L.L.P.

(57) ABSTRACT

In an information processing device, a screen display control part displays an operation screen, and a firmware update part updates a firmware of the screen display control part. An operating state holding part stores an operating state of the information processing device at a time of displaying the operation screen after the firmware is updated by the firmware update part. A high-speed starting part starts the information processing device and displays the operation screen based on the stored operating state.

7 Claims, 16 Drawing Sheets

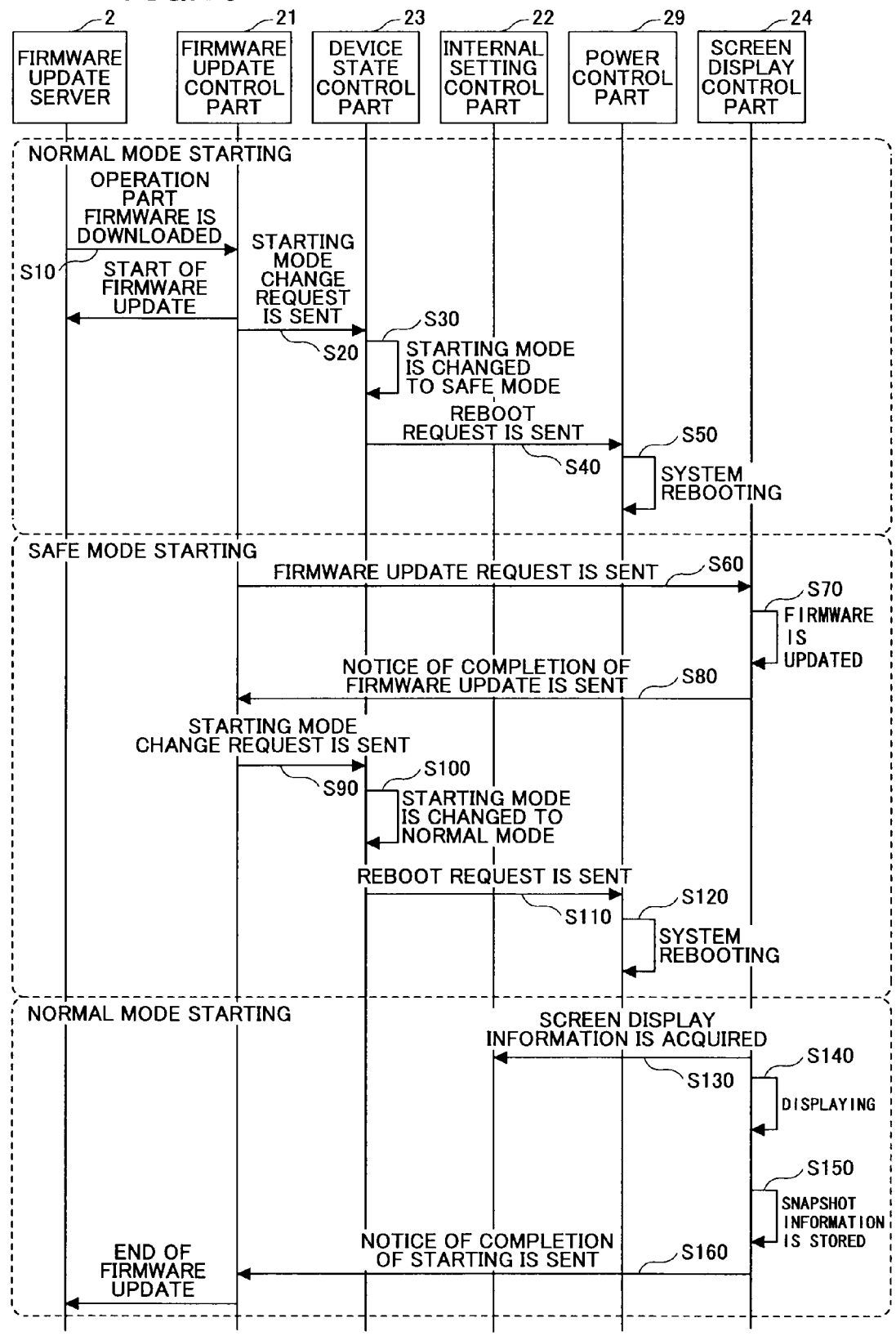

INFORMATION PROCESSING DEVICE, AND METHOD OF STARTING INFORMATION PROCESSING DEVICE

BACKGROUND OF THE INVENTION

1. Field of the Invention

This invention relates to an information processing device and a method of starting the information processing device in which the information processing device is started at a high speed in a process of updating a firmware of a screen display control part.

2. Description of the Related Art

Recently, information processing devices, including image forming devices, have a complicated structure and troubles arising in the information processing devices become increasingly complicated year by year. To remove the device troubles, a new firmware (or debugging information, etc.) is acquired at the information processing device through a network or an external recording medium and a previous firmware is updated by the new firmware.

However, when the firmware is updated, rebooting or starting of the information processing device is needed. For this reason, much time is required to complete the updating of the firmware. A conceivable method for shortening the starting time is to perform the starting of the information processing device using the hibernation.

The hibernation is a function of storing the initialized information of various hardware components, the register information, etc., existing in a volatile memory (RAM) upon start-up of the information processing device, into a nonvolatile memory (ROM) immediately before turning off the power of the information processing device. By using the hibernation function, it is possible to quickly read the stored information from the nonvolatile memory (ROM) and rewrite it to the volatile memory (RAM) when starting the information processing device next time. The initialization setting and communication setting processes which require a certain period of time can be omitted, and it is possible to perform the starting of the information processing device at a high speed.

For example, Japanese Laid-Open Patent Application No. 9-319667 discloses a high-speed starting method based on the hibernation function which is aimed at starting the information processing device at a higher speed. In this method, a portion of the main memory unit that is actually used is determined, and the process of transmitting data of other portions of the main memory unit to the fixed memory unit is omitted.

However, there is another high-speed starting method for a screen display control part. In this method, a snapshot of a display screen is stored in the ROM, and, at a time of starting the information processing device next time, the snapshot stored in the ROM is developed to the RAM. In the case of using this method, if the firmware of the screen display control part is updated, a new snapshot of a display screen must be reconstructed. The snapshot herein means the initialized information of various hardware components and the register information which exist in the work area of the RAM at a certain instant. The snapshot may include, for example, the screen display information used for displaying an operation screen in the information processing device.

SUMMARY OF THE INVENTION

In one aspect of the invention, the present disclosure provides an improved information processing device in which the above-described problems are eliminated.

In one aspect of the invention, the present disclosure provides an information processing device which is able to shorten the starting time by displaying the previously stored screen information in the process of updating the firmware of the screen display control part.

In an embodiment of the invention which solves or reduces one or more of the above-mentioned problems, the present disclosure provides an information processing device comprising: a screen display control part configured to display an operation screen; a firmware update part configured to update a firmware of the screen display control part; an operating state holding part configured to store an operating state of the information processing device at a time of displaying the operation screen after the firmware is updated by the firmware update part; and a high-speed starting part configured to start the information processing device and to display the operation screen based on the operating state stored by the operating state holding part.

BRIEF DESCRIPTION OF THE DRAWINGS

FIG. 16 is a sequence diagram for explaining the firmware update process by the image forming device of the second embodiment.

DETAILED DESCRIPTION OF THE PREFERRED EMBODIMENTS

A description will be given of embodiments of the invention with reference to the accompanying drawings.

Figure 1:
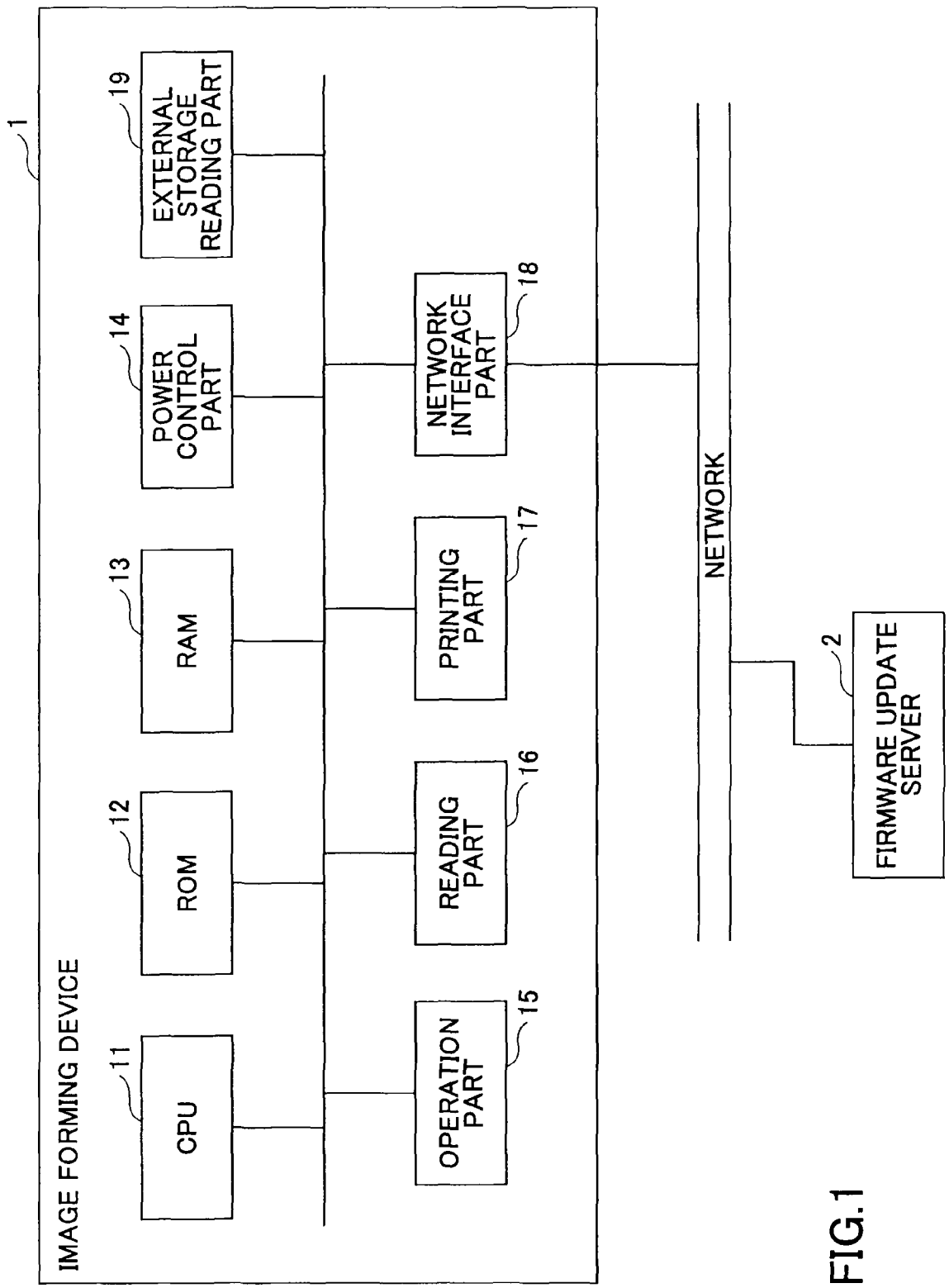
FIG. 1 is a diagram showing the hardware composition of an image forming device of a first embodiment of the invention.

FIG. 1 shows the hardware composition of an image forming device 1 of a first embodiment of the invention. The image forming device 1 of this embodiment includes a central processing unit (CPU) 11 to perform computations and control processing, a ROM 12 as a nonvolatile memory, a RAM 13 as a volatile memory, a power control part 14, an operation part 15 as a user interface, a reading part 16 as an image input device, and a printing part 17 to perform printing of a read image. The image forming device 1 is a typical example of the information processing device of the invention.

Moreover, the image forming device 1 of this embodiment includes a network interface part 18 and an external storage reading part 19. Using the network interface part 18 and the external storage reading part 19, the image forming device 1 receives a new firmware from a firmware update server 2 via the network and the network interface part 18, stores the received firmware in an external storage (not shown), and updates the existing firmware with the stored firmware read from the external storage through the external storage reading part 19.

Figure 2:
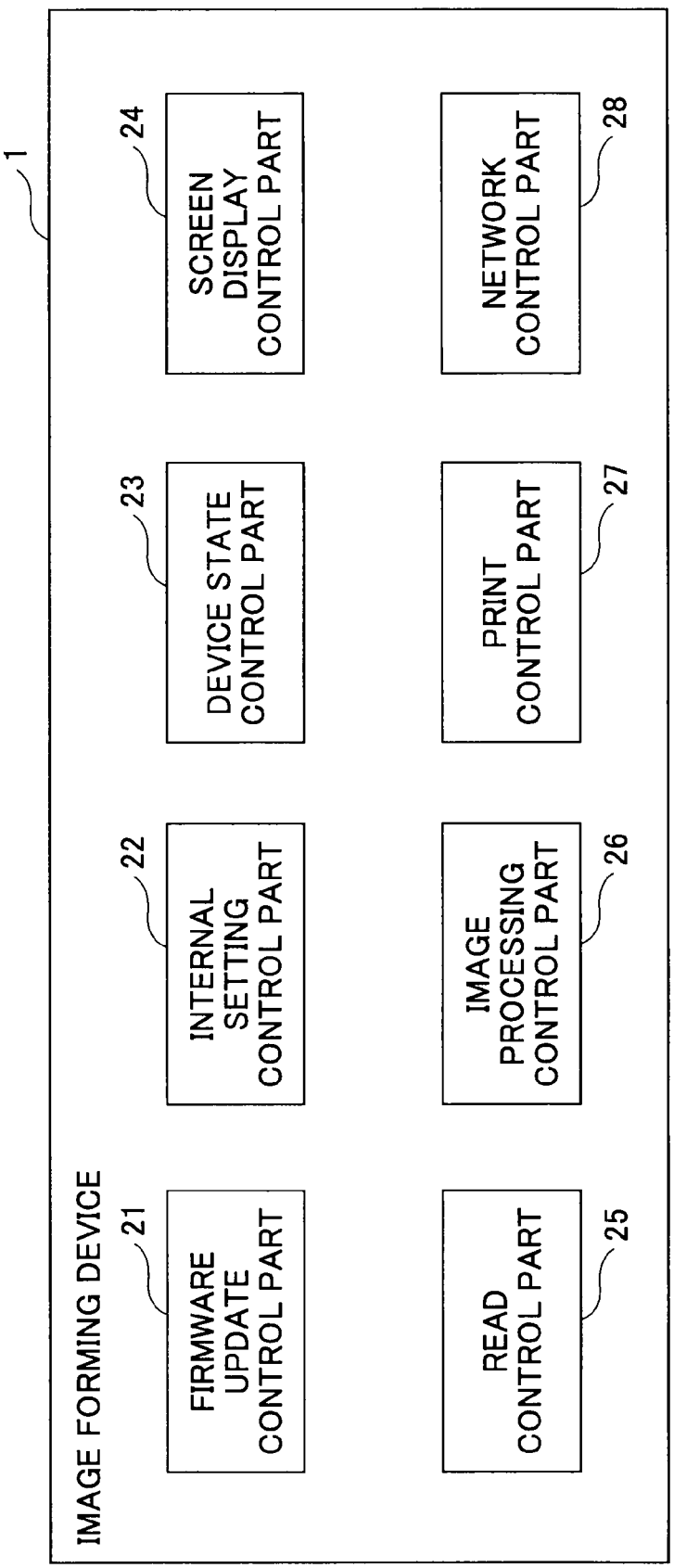
FIG. 2 is a diagram showing the software composition of the image forming device of the first embodiment.

FIG. 2 shows the software composition of the image forming device 1 of the first embodiment. The image forming device 1 of this embodiment includes a firmware update control part 21, an internal setting control part 22, a device state control part 23, a screen display control part 24, a read control part 25, an image processing control part 26, a print control part 27, and a network control part 28.

The firmware update control part 21 performs the updating of the firmware, stores the display screen information (such as a snapshot), and reconstructs the screen displaying condition immediately at a next time of returning of the screen displaying condition.

The internal setting control part 22 manages various kinds of device setting information. The device state control part 23 manages the current operating state of the image forming device 1. The screen display control part 24 performs the control of the screen displaying.

The read control part 25 reads document information. The image processing control part 26 edits the read document or the input image data. The print control part 27 performs the printing of the read document or the edited image data. The network control part 28 performs the control of the inputting and outputting of data with an external computer (the firmware update server 2) outside the image forming device 1.

Figure 3:
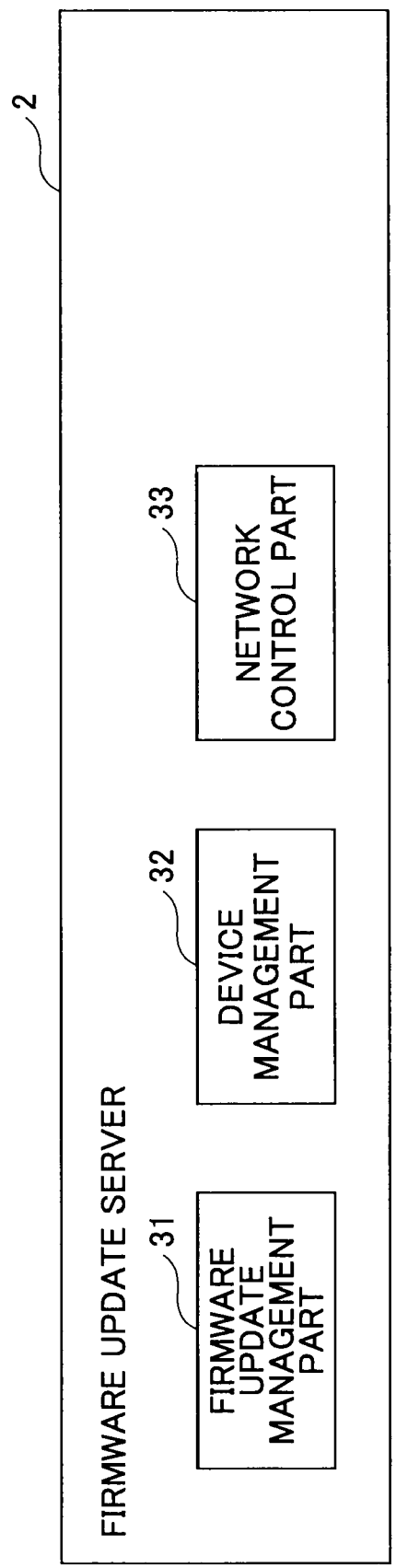
FIG. 3 is a diagram showing the software composition of a firmware update server in the first embodiment.

FIG. 3 shows the software composition of the firmware update server 2 in the first embodiment. The firmware update server 2 of this embodiment includes a firmware update management part 31, a device management part 32, and a network control part 33.

The firmware update management part 31 manages the updating states and the records of the firmware. The device management part 32 manages the state of the firmware of a device which is connected to the firmware update server 2 via the network. The network control part 33 inputs data from or outputs data to the device connected to the firmware update server 2 via the network.

Figure 11:
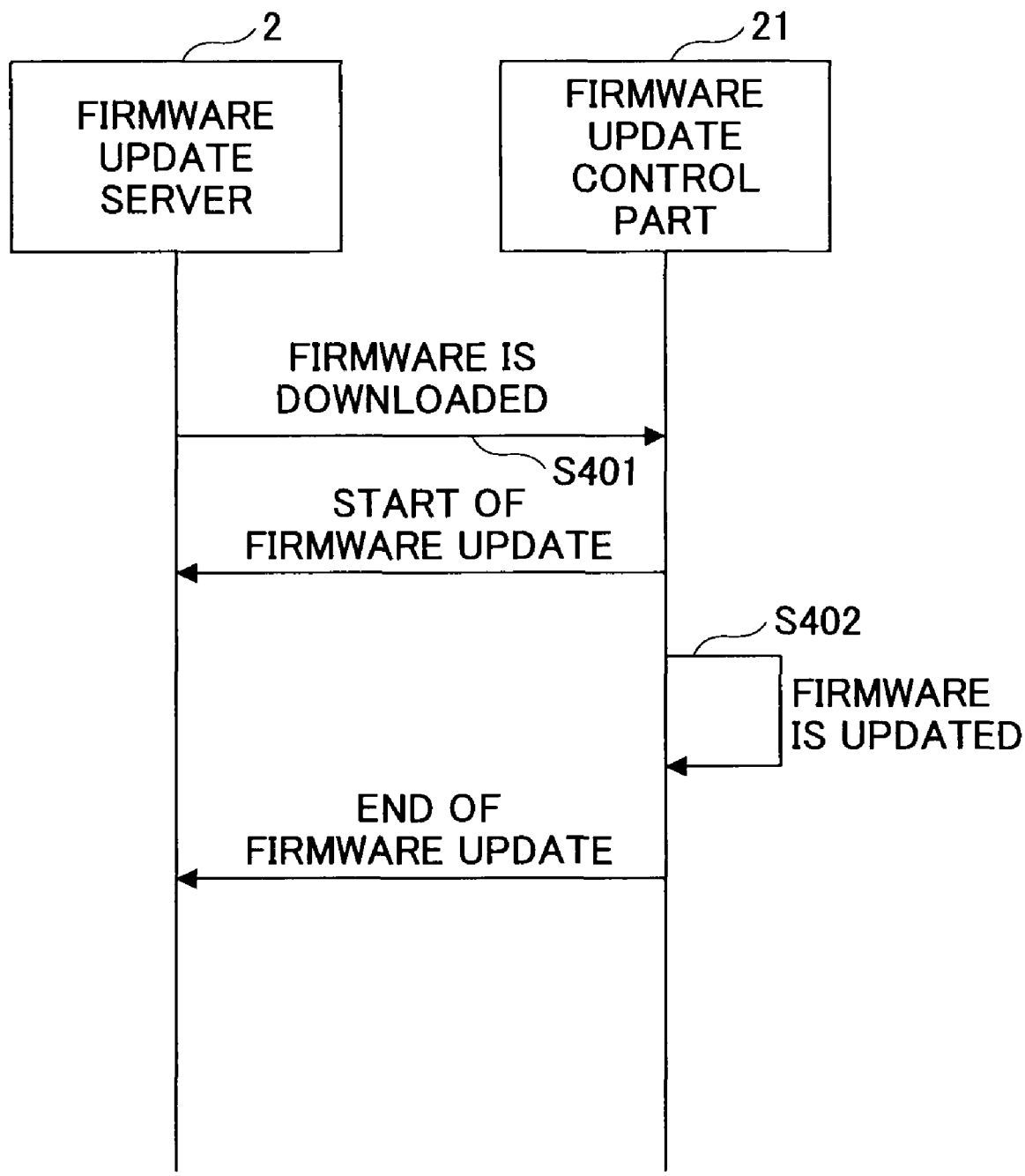
FIG. 11 is a sequence diagram for explaining the firmware update process according to the related art.

FIG. 11 is a sequence diagram for explaining the firmware update process according to the related art. As shown in FIG. 11, when updating the firmware according to the related art, the firmware update control part 21 downloads the firmware from the firmware update server 2 in step S401.

In step S402, using the firmware downloaded in the step S401, the firmware update control part 21 updates the firmware, and the firmware update process is terminated.

As mentioned above, it should be noted that, when the firmware is updated according to the related art, any processes other than the firmware update process are not performed.

Next, the firmware update process which is performed by the image forming device 1 of this embodiment will be described.

Figure 4:
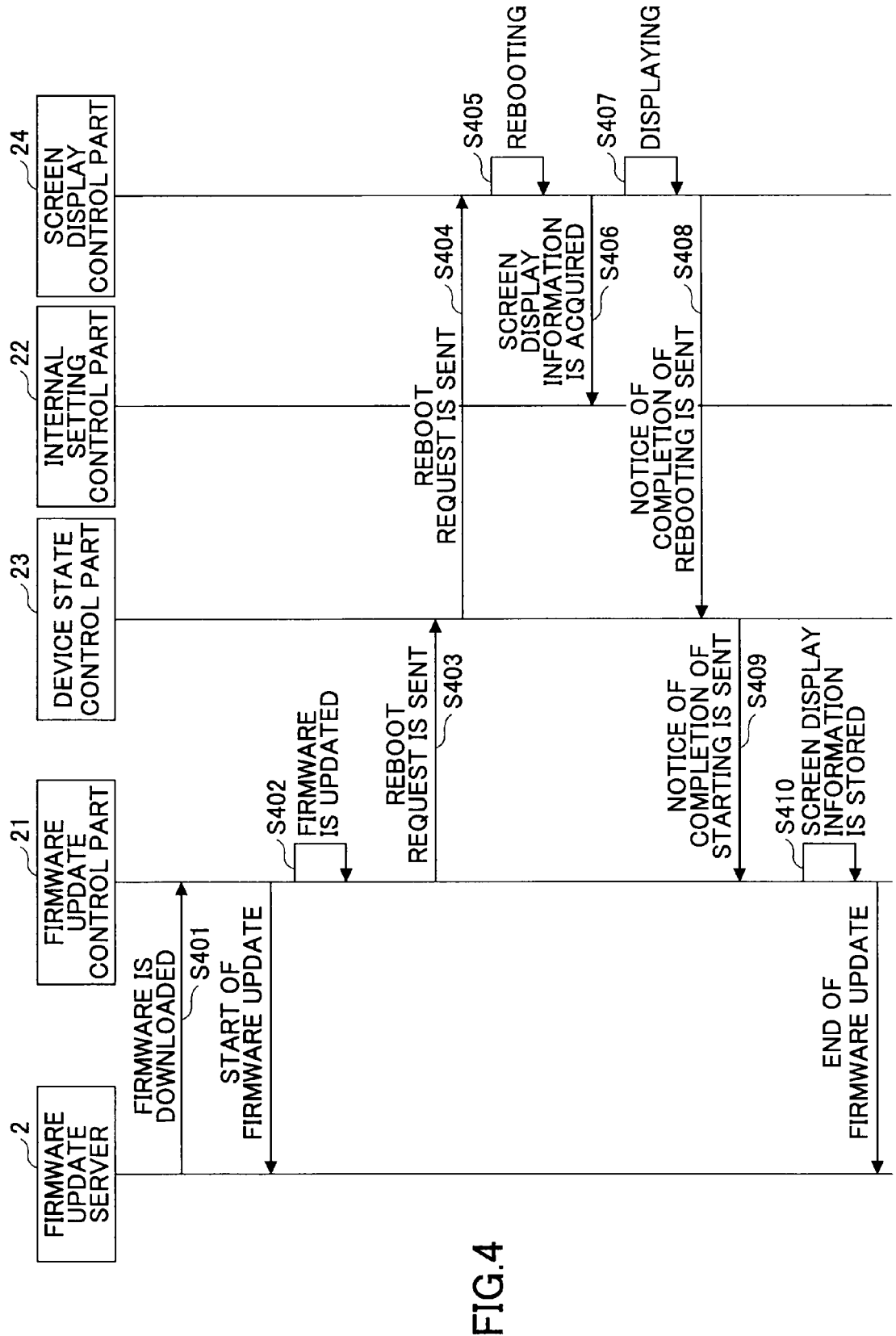
FIG. 4 is a sequence diagram for explaining a firmware update process which is performed by the image forming device of the first embodiment.

FIG. 4 is a sequence diagram for explaining the firmware updating process which is performed by the screen display control part 24 in the first embodiment.

First, the firmware update control part 21 downloads the firmware from the firmware update server 2 (step S401).

The firmware update control part 21 updates the firmware based on the downloaded firmware (step S402) and sends a request for the rebooting the operation part 15 to the device state control part 23 (step S403).

The device state control part 23 sends a reboot request to the screen display control part 24 (step S404), and the screen display control part 24 is rebooted in response to the request (step S405).

Next, the screen display control part 24 acquires the screen display information from the internal setting control part 22 and sends the same to the operation part 15 (step S406). The screen display control part 24 displays the operation screen (step S407).

The screen display information acquired in step S406 by the screen display control part 24 is information for displaying the operation screen on the operation part 15 after the updating of the firmware. Namely, the screen display information is information for displaying an operation screen on the operation part 15, and various kinds of setting information of the firmware before updating are corrected and modified according to the firmware after updating.

Next, the screen display control part 24 transmits a notice of completion of the rebooting to the device state control part 23 (step S408), and the device state control part 23 notifies the firmware update control part 21 that the starting of the screen display control part 24 is completed (step S409).

After the notice indicating the completion of the starting is received, the firmware update control part 21 stores the present screen information (step S410) so that the updating of the firmware is completed. The present screen information stored in step S410 by the firmware update control part 21 is information indicating the operating state of the system at the time of displaying the operation screen on the operation part 15 (i.e., a snapshot). This information is stored in the work area of the RAM 13. For example, in the step S410, the firmware update control part 21 stores the information existing in the work area of the RAM 13 into the ROM 12.

As mentioned above, the screen information is stored beforehand after the update of the firmware, and it is no longer necessary to reconstruct the screen information at the time of starting, and it is possible to start the image forming device at higher speed than that at the time of updating the firmware according to the related art.

Figure 12:
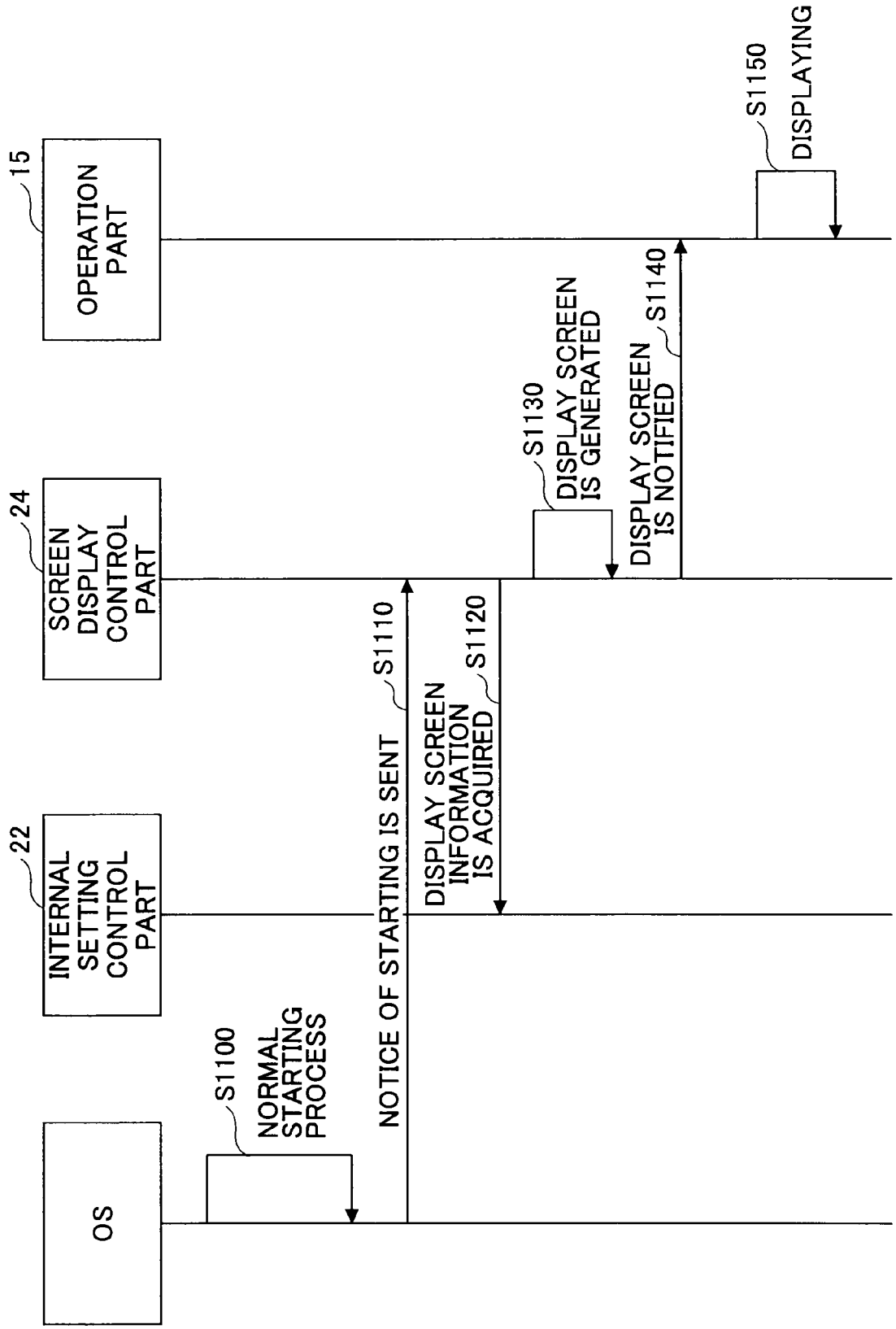
FIG. 12 is a sequence diagram for explaining the process according to the related art after the OS is started and until an operation screen is displayed.
Figure 13:
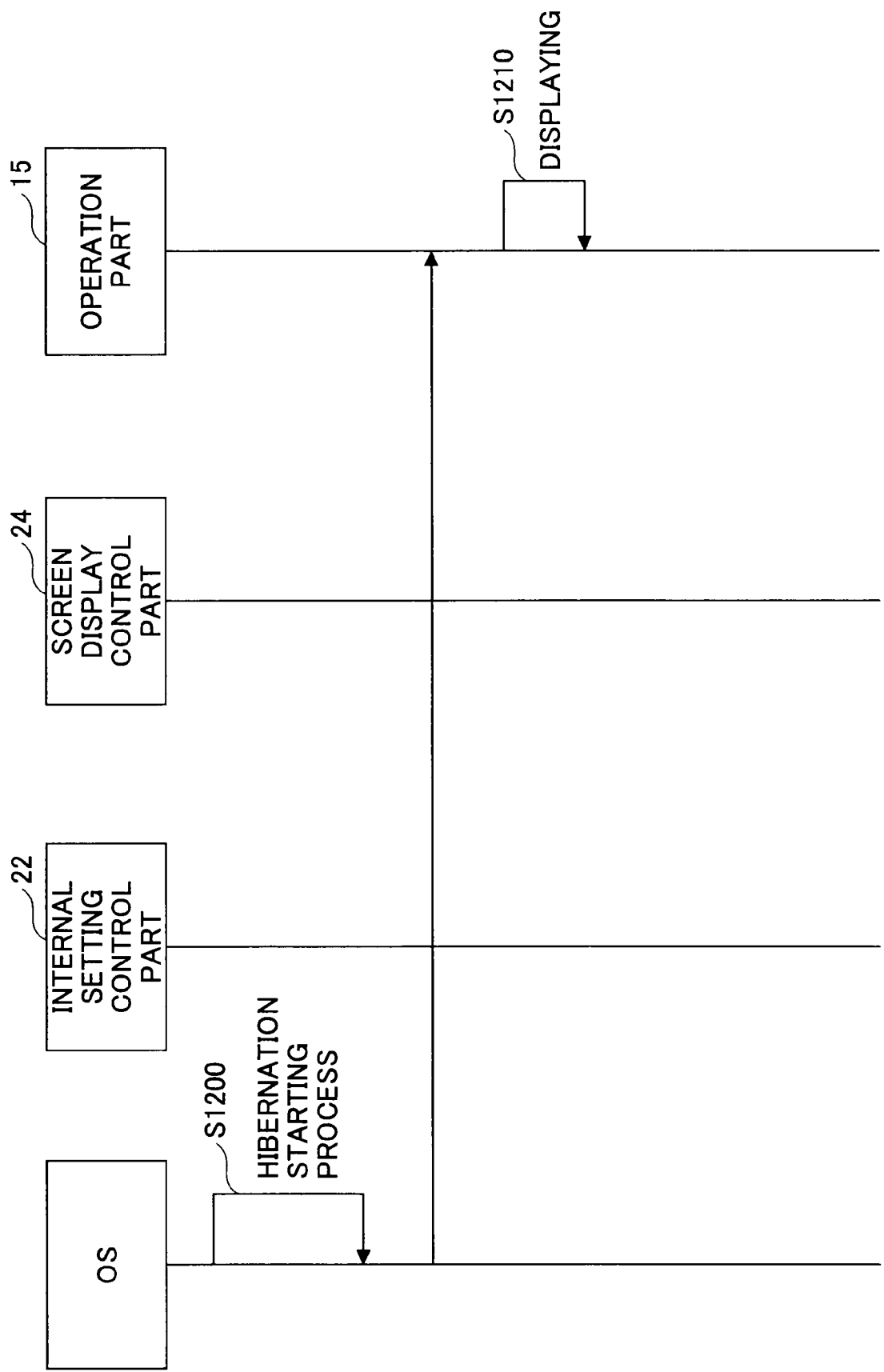
FIG. 13 is a sequence diagram for explaining the process performed by the image forming device of the first embodiment after the OS is started and until an operation screen is displayed.

Next, the processing according to the related art is compared with the processing according to the invention about the operation screen display process after the update of the firmware with reference to FIG. 12 and FIG. 13.

FIG. 12 is a sequence diagram for explaining the process according to the related art after the OS is started and until an operation screen is displayed on the operation part 15.

After the OS (operating system) is started in step S1110, the OS notifies the screen display control part 24 that the starting processing is performed in step S1110.

In step S1120, the screen display control part 24 acquires the screen display information and 24 from the internal setting control part 22. In step S1130, the screen display control part 24 creates information for displaying the operation screen on the operation part 15, based on the acquired screen display information.

In step S1140, the screen display control part 24 notifies to the operation part 15 (such as an LCD display) the information for displaying the operation screen created in step S1130. In step S1150, the operation screen is displayed on the operation part 15 based on the information of the operation screen acquired in step S1140.

FIG. 13 is a sequence diagram for explaining the process performed by the image forming device of the first embodiment in which the hibernation starting is performed using the stored operating state and an operation screen is displayed.

In the process shown in FIG. 13, in step S1200, the OS copies the operating state to be held in the ROM 12 to the RAM 13 and performs the hibernation starting. When the operating state is stored, the operation screen currently displayed on the operation part 15 is restored promptly, and the operation screen is displayed on the operation part 15 (such as an LCD display) in step S1210.

In this embodiment, the hibernation starting is performed using the stored operating state, the time for displaying the operation screen on the operation part 15 can be omitted and the time for updating the firmware can be shortened.

Next, the modification of the process performed by the firmware update control part 21 in which the operating state of the system is stored after the firmware is updated will be described.

In the following modification, the starting process which is performed after the firmware update control part 21 stores the operating state of the system is the same as that in the process described with reference to FIG. 13.

Figure 5:
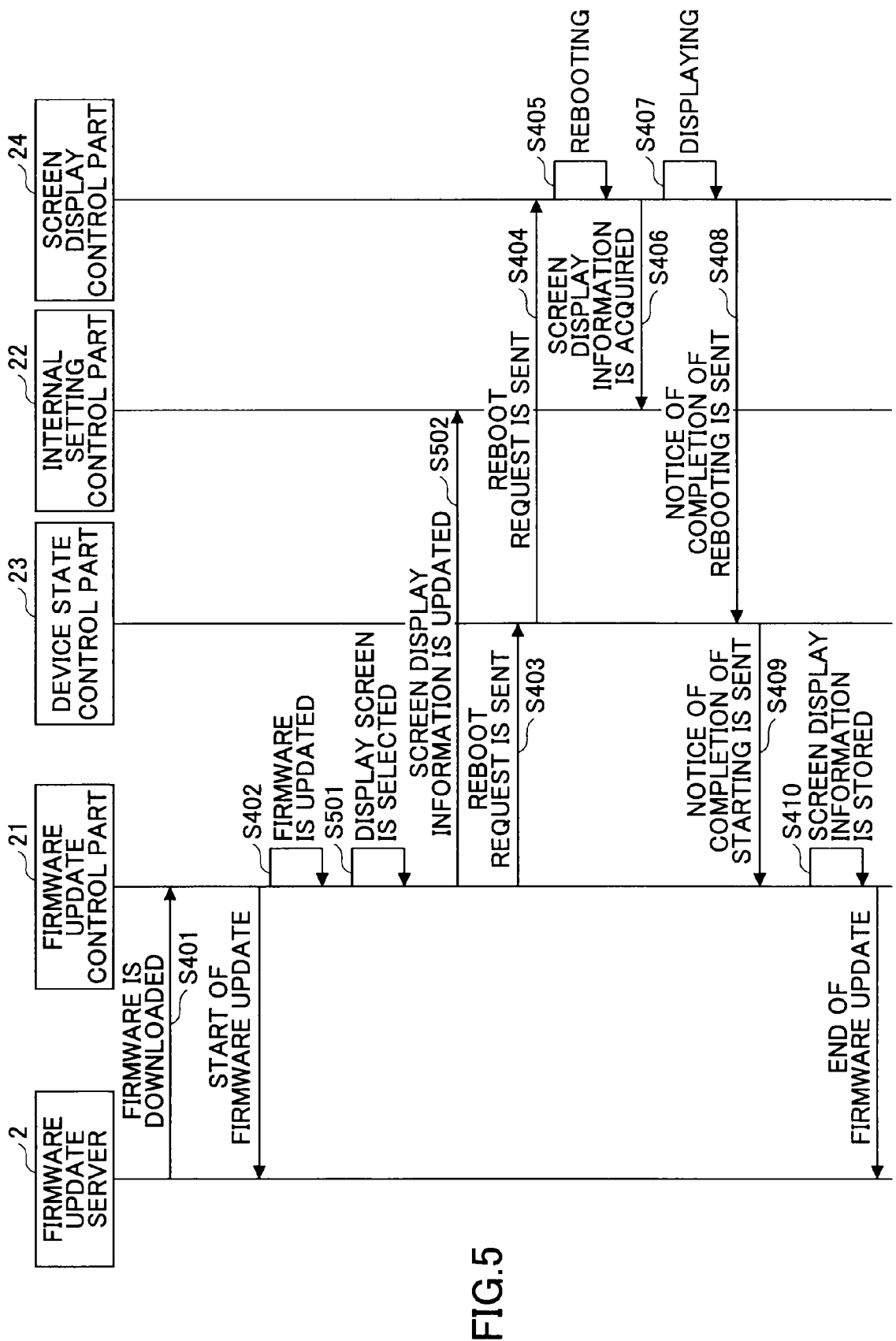
FIG. 5 is a sequence diagram for explaining a firmware update process which is performed by the image forming device of the first embodiment.

FIG. 5 is a sequence diagram for explaining the process in which the screen to be displayed on the operation part 15 is selected after the update of the firmware.

Figure 6:
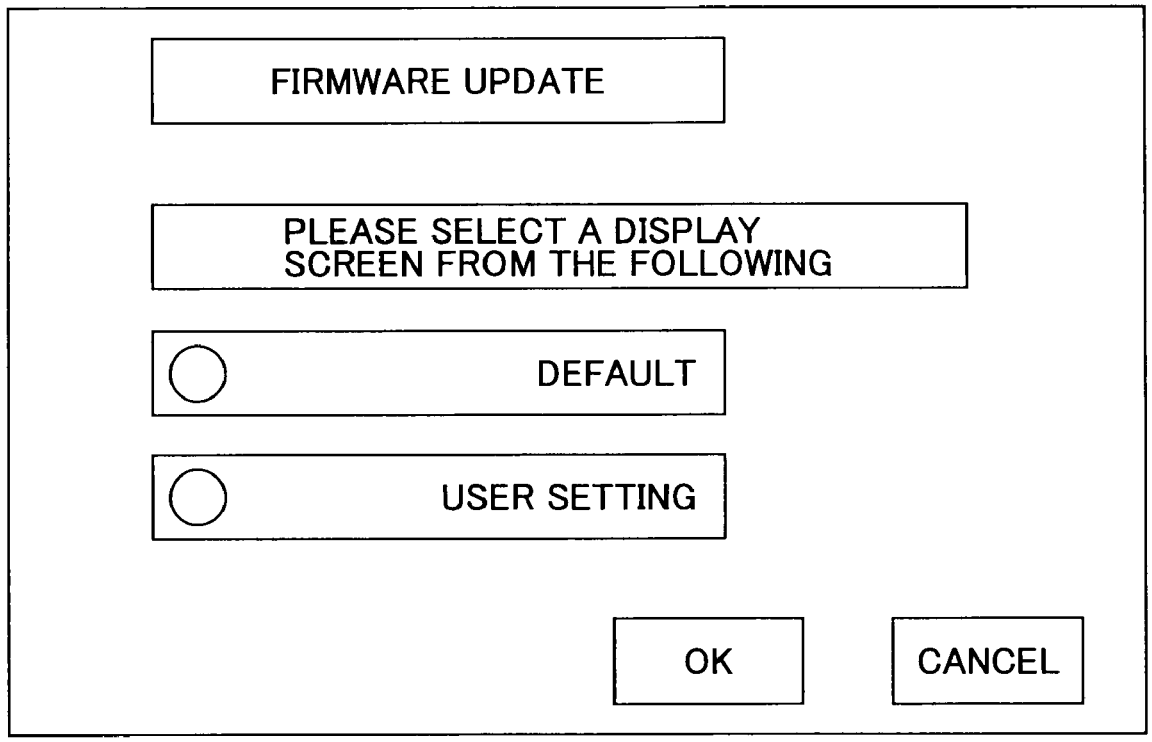
FIG. 6 is a diagram showing a selection screen for selecting a starting display screen of the image forming device of the first embodiment.

In the process shown in FIG. 5, after the update of the firmware (step S402), the display screen selection screen as shown in FIG. 6 is displayed, the user is requested to select a desired screen to be displayed from among the display screens stored beforehand in the memory (step S501), and the firmware update control part 21 updates the information on the initial display screen to the internal setting control part 22 based on the selected result (step S502). The subsequent steps are the same as those of the process shown in FIG. 4.

The user can choose the operation screen to be displayed on the operation part 15 after the updating of the firmware, and the time for updating the firmware can be shortened, which will improve the convenience of the user appropriately.

Another method of choosing the screen displayed on the operation part 15 during the firmware updating process is that the condition parameter for the initial display screen is added to the firmware by the firmware update control part 21, and the initial starting screen is specified by the condition parameter.

Figure 7:
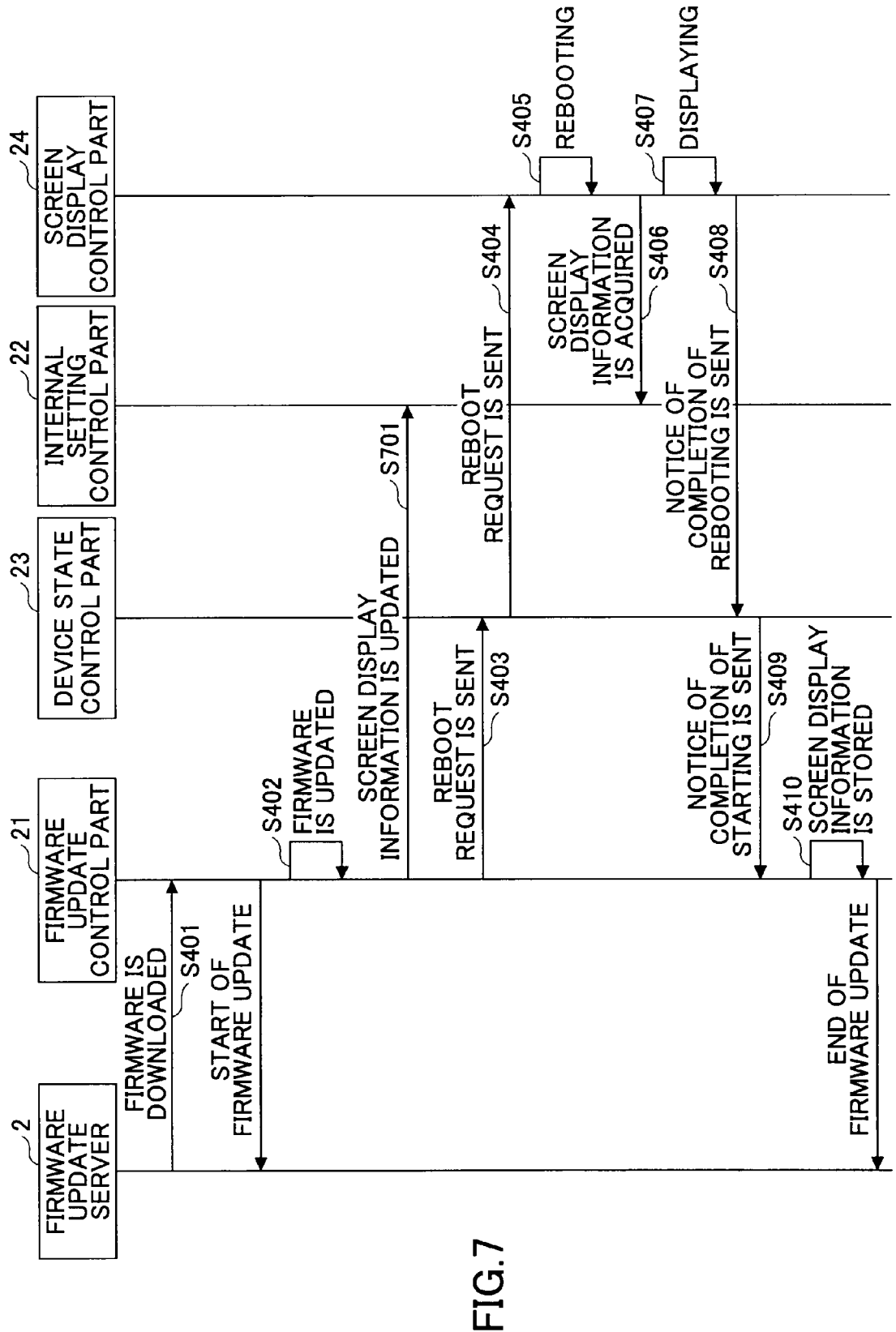
FIG. 7 is a sequence diagram for explaining a firmware update process which is performed by the image forming device of the first embodiment.

Namely, as shown in FIG. 7, after the updating of the firmware (step S402), the firmware update control part 21 updates the information on the initial display screen of the internal setting control part 22 based on the parameter information specified in the firmware (step S701).

In this manner, the time for updating the firmware can be shortened, and the user is able to select the operation screen to be displayed on the operation part 15 after the updating of the firmware, which will improve the convenience of the user appropriately.

In another embodiment of the invention, the firmware which contains the screen display information beforehand is downloaded and the updating of the firmware is performed. The screen display information may include the image data and various setting information on the information for displaying the operation screen on the operation part 15 based on the firmware after updating.

Figure 8A:
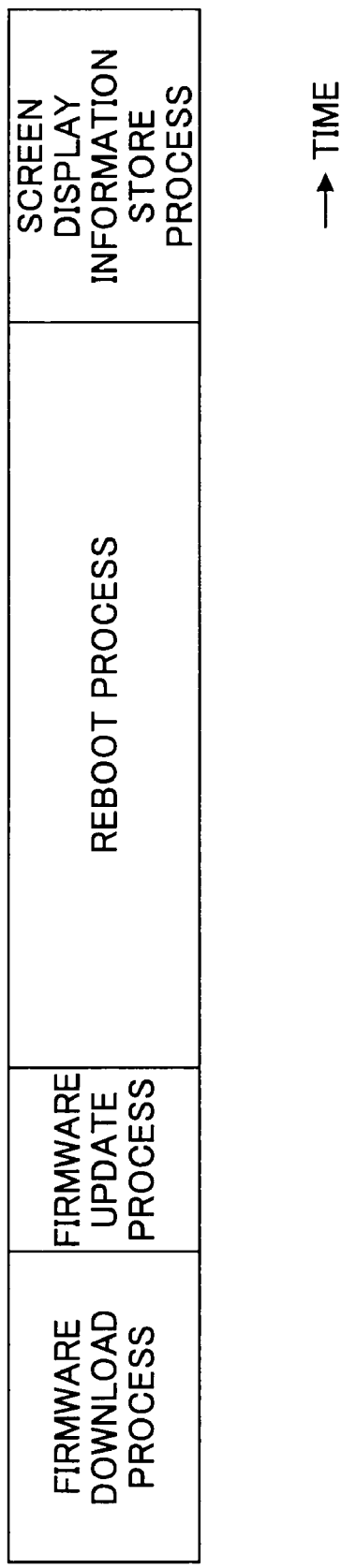
FIG. 8A and FIG. 8B are diagrams showing the ratio of the time of each process to the time of the whole firmware update process.
Figure 8B:
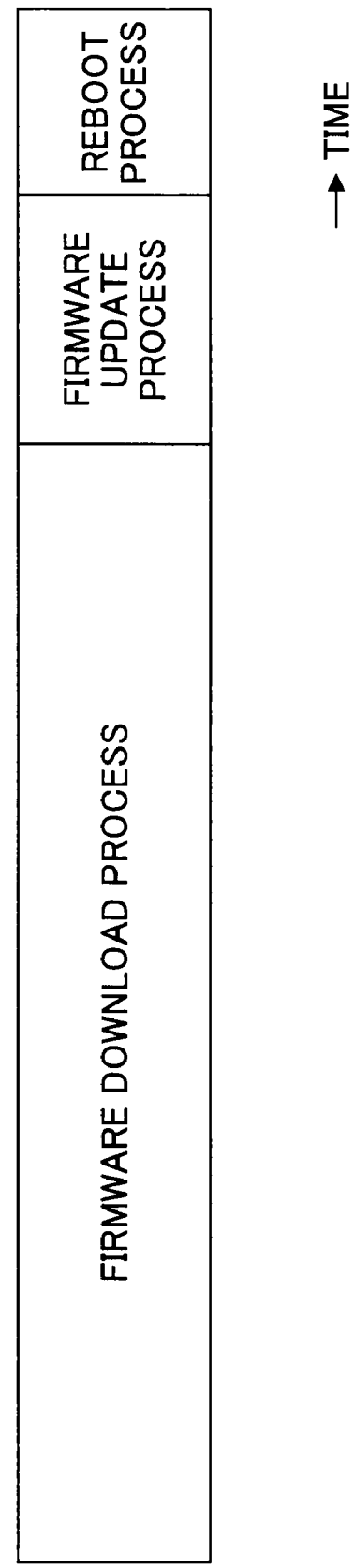

FIG. 8A and FIG. 8B show the ratio of the time of each process to the time of the whole firmware update process in the case of the related art and in the case of the first embodiment, respectively.

As shown in FIG. 8A, in the case in which the image forming device stores the display screen information (the hibernation) according to the related art, the capacity of the firmware is comparatively small and the time for the downloading is comparatively short. However, it is necessary for the image forming device according to the related art to perform the process of storing the display screen information after the rebooting, and the total time for the whole process is comparatively long.

As shown in FIG. 8B, in the case of this embodiment, the firmware contains the screen display information and the capacity of the firmware is comparatively large, and the time for downloading of the firmware takes some time. However, it is not necessary for the image forming device 1 of this embodiment to perform the process of storing the display screen information. In recent years, the communication speed has been increased and the updating of the firmware at a higher speed is expectable.

Figure 9:
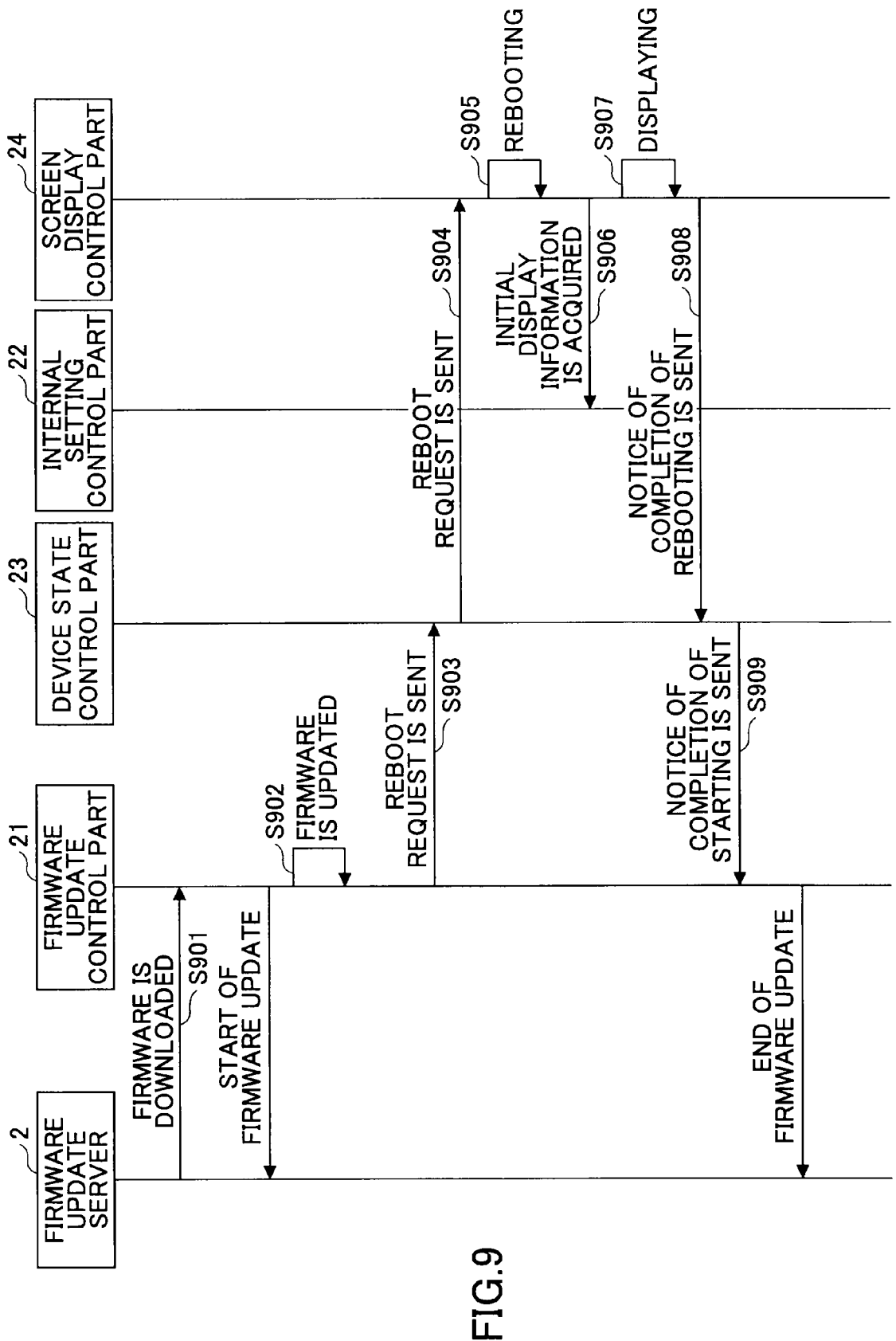
FIG. 9 is a sequence diagram for explaining a firmware update process which is performed by the image forming device of the first embodiment.

FIG. 9 is a sequence diagram for explaining the process of updating the firmware of the screen display control part 24 to which the screen display information is added.

First, the firmware update control part 21 downloads the firmware which contains the display screen information, from the firmware update server 2 (step S901).

The firmware update control part 21 performs the updating of the firmware based on the downloaded firmware (step S902), and transmits a reboot request to the device state control part 23 after the updating of the firmware (step S903).

Next, the device state control part 23 sends a reboot request to the screen display control part 24 (step S904), and the screen display control part 24 performs rebooting of the image forming device 1 in response to the request (step S905).

At this time, the screen displaying is performed based on the initial display information (step S906) acquired from the internal setting control part 22, and based on the screen display information stored in the firmware (step S907).

Then, the screen display control part 24 sends a notice of completion of the rebooting to the device state control part 23 (step S908), and the device state control part 23 notifies the firmware update control part 21 that the starting is completed, so that the updating of the firmware is completed (step S909).

Figure 10:
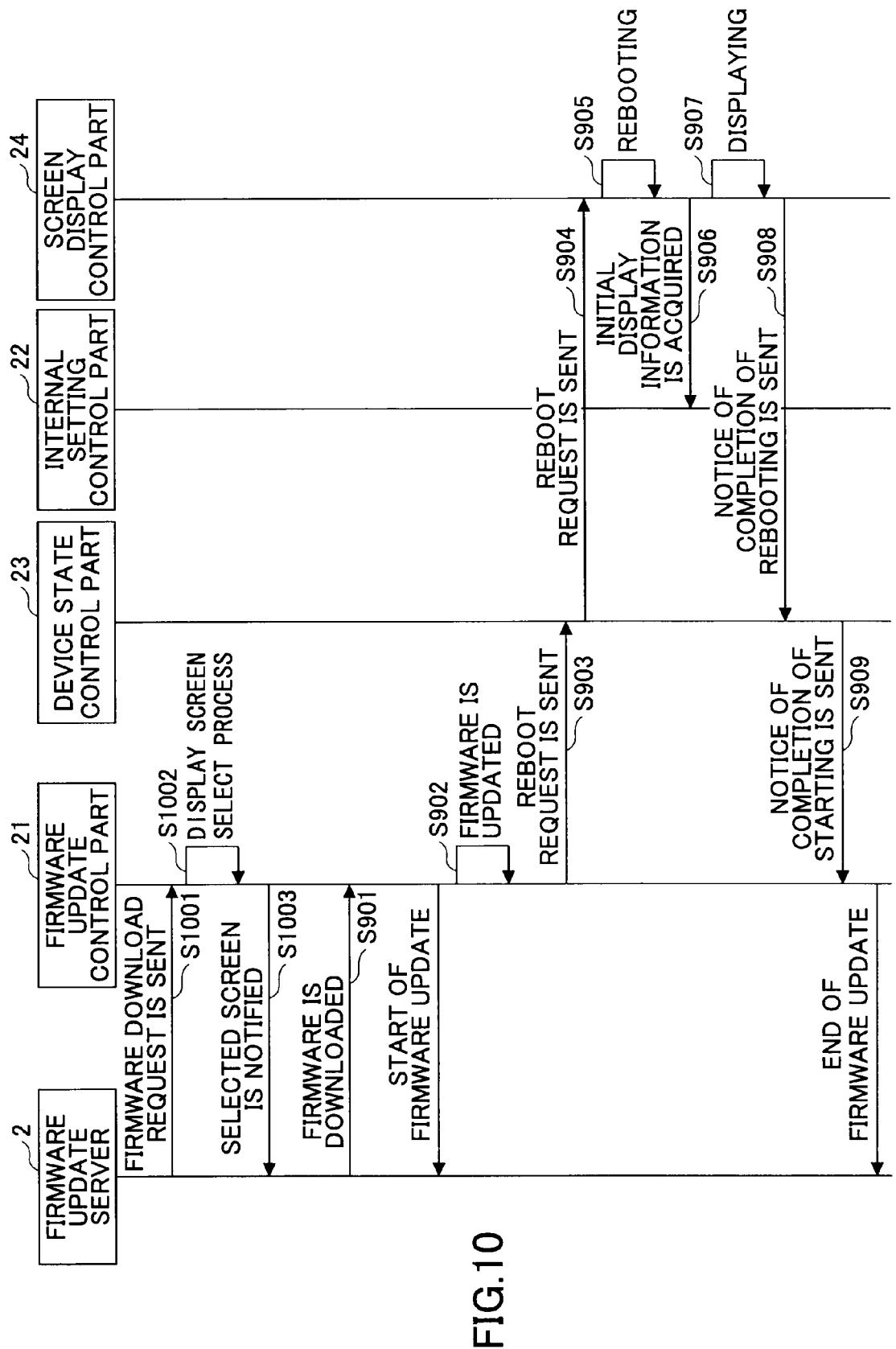
FIG. 10 is a sequence diagram for explaining a firmware update process which is performed by the image forming device of the first embodiment.

In the above-mentioned starting method, it is also possible that a desired starting screen be selected beforehand and the selected screen be included in the firmware so that the starting screen is displayed. In that case, as shown in FIG. 10, after the downloading request is received from the firmware update server (step S1001), a desired starting screen is chosen from the selection screen as shown in FIG. 6 (step S1002). The selected screen is notified to the firmware update server 2 (step S1003), so that the updating is started with the firmware containing the notified result. The subsequent steps are the same as those corresponding steps in FIG. 9.

In this embodiment, the OS performs the hibernation starting in the step 1200 in FIG. 13 by using the screen display information included in the firmware, the displaying of the operation screen can be omitted and the updating time of the firmware can be shortened.

In the above-mentioned method of updating the firmware, the firmware is downloaded via the network. Alternatively, a method of updating the firmware in which the firmware is downloaded using an external storage or the like may be used.

The second embodiment of the invention will be described. It is assumed that the firmware update server 2 of the second embodiment has the hardware and software compositions that are the same as those of the firmware update server 2 of the first embodiment described above.

Figure 14:
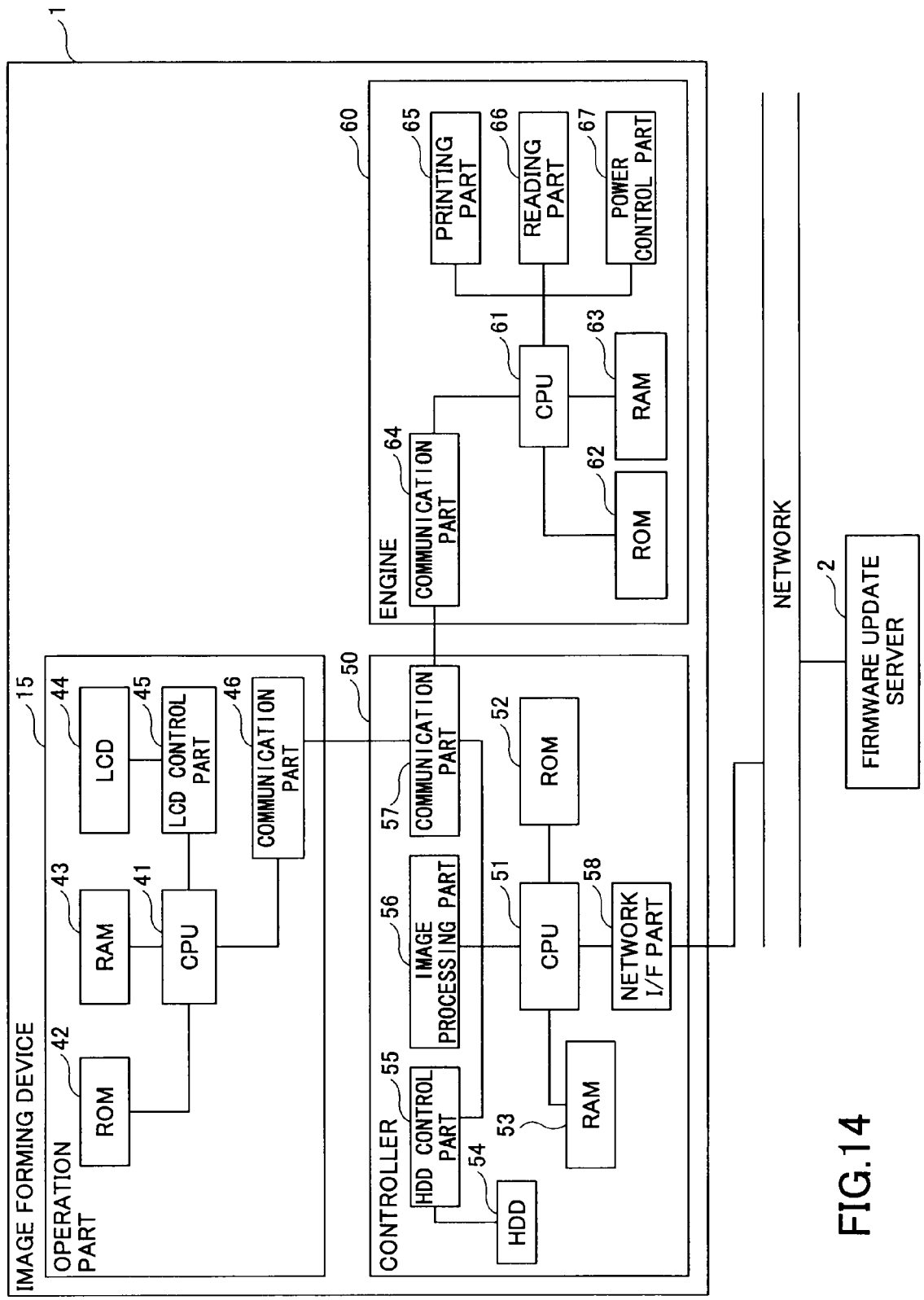
FIG. 14 is a diagram showing the hardware composition of an image forming device of a second embodiment of the invention.

FIG. 14 shows the hardware composition of the image forming device 1 of the second embodiment.

As shown in FIG. 14, the image forming device 1 includes an operation part 15, a controller 50, and an engine 60. The operation part 15 includes a CPU 41, a ROM 42, a RAM 43, a LCD 44, a LCD control part 45, and a communication part 46.

The CPU 41 is a device which controls the operation part 15 which carries out a user interface function. The CPU 41 performs computation processing on the RAM 43 in accordance with the program stored in the ROM 42, and controls the entire operation part 15.

The LCD 44 is a display device for carrying out a user interface function, and the LCD control part 45 controls the displaying of the operation screen on the LCD 44.

The communication part 46 communicates with the controller 50 which will be described later.

As shown in FIG. 14, the controller 50 controls the engine 60 (which will be described later). The controller 50 is a device which controls the engine 60 to perform image processing and image formation processing of the image forming device 1. The controller 50 includes a CPU 51, a ROM 52, a RAM 53, a HDD 54, a HDD control part 55, an image processing part 56, a communication part 57, and a network interface part 58.

The CPU 51 is a device which controls the entire controller 50. The CPU 51 controls the entire controller 50 by performing the computation processing on the RAM 53 or HDD 54 in accordance with the program stored in the ROM 52 or the HDD 54.

The HDD control part 55 controls the reading of data from and the writing of data to the HDD 54 as a mass storage device. The image processing unit 56 performs image processing under the control of the CPU 51. The communication part 57 performs communications with the operation part 15. The network interface part 58 performs communications with the firmware update server 2 via an external network.

As shown in FIG. 14, the engine 60 is a device which performs physically image processing and image formation processing of the image forming device 1. The engine 60 includes a CPU 61, a ROM 62, a RAM 63, a communication part 64, a printing part 65, a reading part 66, and a power control part 67.

The CPU 61 is a device which controls the entire engine 60. The CPU 61 controls the entire engine 60 by performing computation processing on the RAM 63 in accordance with the program stored in the ROM 62. The printing part 65 includes the plotter to form an image on a printing medium based on the image data. The reading part 66 includes the scanner to optically acquire image data as a processing object from a document. The power control part 67 controls the electric power supplied to the printing part 65 and the reading part 66. The communication part 64 is a device which communicates with the controller 50. For example, the communication part 64 receives and transmits the control information of the printing part 65 and the reading part 66 accompanied with the image processing and the image formation processing.

Figure 15:
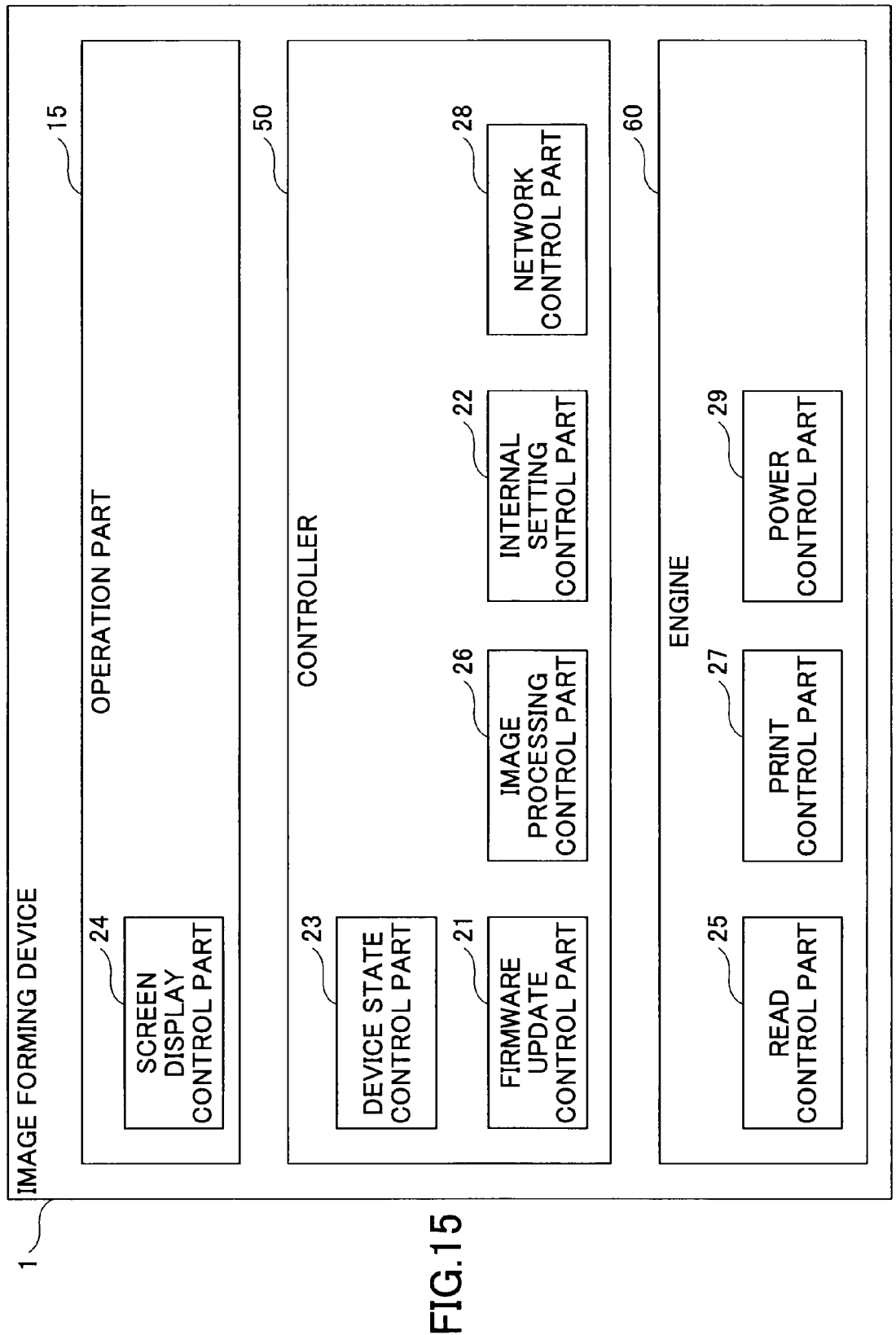
FIG. 15 is a diagram showing the software composition of the image forming device of the second embodiment.

FIG. 15 shows the software composition of the image forming device 1 of the second embodiment.

As shown in FIG. 15, the operation part 15 includes a screen display control part 24. This screen display control part 24 controls the screen displaying and performs the starting of the operation part 15 by using the hibernation function.

As shown in FIG. 15, the controller 50 includes a device state control part 23, a firmware update control part 21, an image processing control part 26, an internal setting control part 22, and a network control part 28.

The device state control part 23 is an application which manages the operating state of the image forming device 1 and controls the switching of the starting mode (normal mode, safe mode). The firmware update control part 21 is an application which performs the updating of the firmware.

The image processing control part 26 is an application which edits the read document information or the input image data. The internal setting control part 22 is an application which manages various kinds of device setting information. The network control part 28 is an application which performs the outputting and inputting of data with an external computer (including the firmware update server 2) outside the image forming device 1.

As shown in FIG. 15, the engine 60 includes a read control part 25, a print control part 27, and a power supply control part 29.

The read control part 25 is an application which performs the control of document reading. The print control part 27 is an application which performs the printing of the read document or the edited image data. The power supply control part 29 is an application which controls the power supply of the image forming device 1.

Next, the principle of the image forming device 1 of the second embodiment will be described. Because the starting processing of the operation part 15 requires much time conventionally, it is desired to shorten the time for the starting processing. There is a method of shortening the starting time which uses the hibernation starting. In this method, a snapshot of the state (the contents of the registers) of the system memory and hardware at the time of starting of the application is stored, and at the time of power ON, the system memory is restored from the stored snapshot, in order to shorten the starting time.

However, if the firmware of the operation part 15 is updated, the old snapshot of the screen displaying is canceled in the process of updating the firmware, and it is necessary to restore the above-mentioned snapshot. The above-mentioned snapshot includes the screen display information to be displayed on the operation part 15, and it is also necessary to acquire the screen display information from the controller 50.

In this embodiment, the screen display information can be read from not only the operation part 15 but also the external PC. Thus, it is necessary to store the screen display information in the controller 50 which includes the network interface part 58.

If the plug-in function is added in order to customize the image forming device 1, the contents of the functions are increased. The total capacity of the screen display information is also increased, and in such a case, it is difficult to secure the areas of the ROM 52 in which all the functions of the operation part 15 are stored.

On the other hand, the controller 50 is arranged so that one of two kinds of the starting mode, such as a normal mode (the first starting mode) and a safe mode (the second starting mode), is selectable. The normal mode is the starting mode in which all the functions of the image forming devices 1, such as copy, fax, and print functions, can be operated. The safe mode is the starting mode which is used when the updating of the firmware of any of the controller 50, the operation part 15, and the engine 60 is performed. In the safe mode, the updating of the firmware is performed, and it is impossible to operate some of the functions of the image forming device 1.

For example, in the safe mode, the access to the memory, such as the HDD 54 provided in the controller 50 is inhibited, and the screen display information stored in the HDD 54 cannot be transmitted to the operation part 15 in the safe mode. Namely, the screen display information to be displayed in the operation part 15 can be supplied only when the controller 50 is started in the normal mode.

Therefore, in order to store the snapshot after the updating of the firmware of the operation part 15 is performed, it is necessary that the controller 50 is started in the normal mode.

The two kinds of the starting modes are needed because the updating of the firmware must be performed by stopping the program operative in the normal mode and writing the updating information to the ROM. It is necessary to provide the starting mode in which the functions being executed are reduced and the executed programs are limited to the necessary minimum number.

If the normal mode is solely provided, it is necessary to arrange separately the mechanism for restricting the functions in which the restricted operation is performed, in order to reduce the functions being executed.

The reason for performing the updating of the firmware of the operation part 15 in the safe mode is the necessity of the mechanism in which the program started in the normal mode does not operate and the program started in the normal mode can be rewritten by the updating of the firmware. The starting mode in which the above mechanism is arranged is the safe mode.

Before describing the firmware updating process in the second embodiment, the features of the controller 50 will be described.

If the starting processing according to the related art is performed after the firmware of the operation part 15 is updated in the safe mode, the operation part 15 does not store the snapshot. Thus, the hibernation starting using a snapshot cannot be performed, and the normal starting (called non-hibernation starting) which requires a comparatively long starting time will be performed.

There is no need for the controller 50 to perform something on the operation part 15 at the time of the hibernation starting. However, at the time of the non-hibernation starting, the operation part 15 transmits a request for acquiring the screen display information to the controller 50 in order to generate the snapshot of the screen display. In this case, the controller 50 has to answer the acquisition request.

The controller 50 needs to perform different processing at the time of starting, depending on whether the starting method of the operation part 15 is the hibernation starting or the non-hibernation starting. Namely, the controller 50 must support the two starting methods (the hibernation starting and the non-hibernation starting) to be performed by the operation part 15 at the time of starting.

Next, an example of the firmware updating process which is performed by the image forming device 1 of the second embodiment will be described.

FIG. 16 is a sequence diagram for explaining the firmware update process which is performed by the image forming device 1 of the second embodiment. It is assumed that the image forming device 1 is started in the normal mode prior to step S10.

In step S10, the firmware update control part 21 downloads the firmware of the operation part 15 from the firmware update server 2, and the process of updating the firmware of the operation part 15 is started.

In step S20, the firmware update control part 21 sends a starting mode change request to the device state control part 23, and the state control part 23 changes the starting mode from the normal mode to the safe mode in response to the starting mode change request in step S30. The starting condition of the image forming device 1 is set in the safe mode by the step S30.

In step S40, the device state control part 23 sends a reboot request to the power supply control part 29, and the power supply control part 29 performs system reboot in response to the reboot request in step S50.

In step S60, the firmware update control part 21 sends a request for updating the firmware to the screen display control part 24, and in step S70, the screen display control part 24 performs the firmware updating process in response to the firmware updating request. In this manner, the firmware updating process is performed in the safe mode.

In step S80, the screen display control part 24 sends a notice of completion of the firmware updating to the firmware update control part 21. In step S90, the firmware update control part 21 sends a starting mode change request to the device state control part 23, and the device state control part 23 changes the starting mode from the safe mode to the normal mode in response to the starting mode change request in step S100.

In step S110, the device state control part 23 sends a reboot request to the power supply control part 29, and the power supply control part 29 performs the system rebooting in response to the received reboot request in step S120.

In step S130, the screen display control part 24 acquires the screen display information from the device setting control part 23. In step S140, the screen display control part 24 displays the operation screen on the LCD 44 based on the acquired screen display information.

The screen display information acquired by the screen display control part 24 is information for displaying the operation screen on the operation part 15 by the firmware after updating. Namely, the screen display information by the firmware before updating is changed or modified to the information for displaying the operation screen on the operation part 15 by the firmware after updating.

In step S150, the screen display control part 24 stores a snapshot. In step S160, the screen display control part 24 sends a notice of completion of the starting to the firmware update control part 21, so that the firmware updating process is completed.

As mentioned above, in the progress of the firmware updating process, the starting mode is changed from the normal mode to the safe mode or from the safe mode to the normal mode at a suitable timing, and it is possible to acquire the screen display information that is acquirable only in the normal mode. After the above-mentioned firmware updating process is completed, the image forming device 1 of the second embodiment performs the hibernation starting using the snapshot stored in the step S150, as shown FIG. 13.

By performing the firmware updating process of FIG. 13, the controller 50 updates the software of the operation part 15 in the safe mode, changes the safe mode to the normal mode, and transmits the screen display information to the operation part 15 in the normal mode. Thereafter, the operation part 15 stores a snapshot containing the data in the work area used to display the operation screen, and performs the hibernation starting using the stored snapshot at the next time of rebooting in the normal mode.

According to the information processing device of the above-described embodiment, the display screen information (snapshot) is automatically stored after the firmware is updated in the process of updating the firmware of the screen display control part 24, and when starting the information processing device next time, the starting can be performed with the desired starting screen. Therefore, it is possible to shorten the total time of updating the firmware.

The present invention is not limited to the specifically disclosed embodiments, and variations and modifications may be made without departing from the scope of the present invention.

The present application is based on Japanese patent application No. 2008-070399, filed on Mar. 18, 2008, and Japanese patent application No. 2008-273461, filed on Oct. 23, 2008, the contents of which are incorporated herein by reference in their entirety.

What is claimed is:

1. An information processing device comprising:
    a screen display control part configured to display an operation screen;
    a firmware update part configured to update a firmware of the screen display control part;
    an operating state holding part configured to store an operating state of the information processing device at a time of displaying the operation screen after the firmware is updated by the firmware update part; and
    a high-speed starting part configured to start the information processing device and to display the operation screen based on the operating state stored by the operating state holding part,
    wherein the information processing device is operational in one of a first starting mode and a second starting mode, all functions of the information processing device being fully executable in the first starting mode and the functions of the information processing device being partially executable in the second starting mode, and
    wherein, after the firmware is updated by the firmware update part in the second starting mode and the second starting mode is changed to the first starting mode, the operating state holding part stores in the first starting mode the operating state of the information processing device at the time of displaying the operation screen.

2. The information processing device according to claim 1, further comprising a starting screen selecting part configured to select the operation screen which is displayed by the high-speed starting part.

3. The information processing device according to claim 1, wherein the high-speed starting part is configured to start the information processing device in the first starting mode and to display the operation screen based on the operating state stored by the operating state holding part.

4. An information processing device starting method for use in an information processing device including a screen display control part and a firmware update part, the information processing device starting method comprising the steps of:
    displaying an operation screen by the screen display control part;
    updating a firmware of the screen display control part by the firmware update part;
    storing an operating state of the information processing device at a time of displaying the operation screen after the firmware is updated; and
    starting the information processing device and displaying the operation screen based on the stored operating state,
    wherein the information processing device is operational in one of a first starting mode and a second starting mode, all functions of the information processing device being fully executable in the first starting mode and the functions of the information processing device being partially executable in the second starting mode, and
    wherein, after the firmware is updated in the second starting mode and the second starting mode is changed to the first starting mode, the step of storing the operating state of the information processing device stores in the first starting mode the operating state of the information processing device at the time of displaying the operation screen.

5. The information processing device starting method according to claim 4, wherein the step of starting the information processing device and displaying the operation screen starts the information processing device in the first starting mode and displays the operation screen based on the stored operating state.

6. The information processing device starting method according to claim 4, wherein the firmware of the screen display control part, updated by the firmware update part, contains information concerning the operation screen displayed in the step of starting the information processing device and displaying the operation screen, and the operation screen is displayed based on the information concerning the operation screen contained in the firmware.

7. The information processing device starting method according to claim 4, further comprising a step of selecting the operation screen which is displayed in the step of starting the information processing device and displaying the operation screen.

* * * * *